(12) United States Patent
Favaretto

(10) Patent No.: US 8,505,659 B2
(45) Date of Patent: Aug. 13, 2013

(54) ROAD VEHICLE WITH HYBRID PROPULSION

(75) Inventor: Fabrizio Favaretto, Formigine (IT)

(73) Assignee: Ferrari S.p.A., Modena (IT)

(*) Notice: Subject to any disclaimer, the term of this patent is extended or adjusted under 35 U.S.C. 154(b) by 693 days.

(21) Appl. No.: 12/702,108

(22) Filed: Feb. 8, 2010

(65) Prior Publication Data

US 2010/0200315 A1 Aug. 12, 2010

(30) Foreign Application Priority Data

Feb. 9, 2009 (IT) .............................. BO2009A0061

(51) Int. Cl.
*B60K 6/42* (2007.10)

(52) U.S. Cl.
USPC .......................... 180/65.6; 180/305; 192/3.51

(58) Field of Classification Search
USPC .......... 180/65.6, 65.21, 65.22, 65.25, 65.265, 180/306, 69.6, 305; 74/340; 192/3.51
See application file for complete search history.

(56) References Cited

U.S. PATENT DOCUMENTS

| | | | | |
|---|---|---|---|---|
| 5,935,035 | A * | 8/1999 | Schmidt | 475/5 |
| 6,170,587 | B1 * | 1/2001 | Bullock | 180/69.6 |
| 6,427,550 | B1 * | 8/2002 | Bowen | 74/336 R |
| 6,490,945 | B2 * | 12/2002 | Bowen | 74/339 |
| 7,059,986 | B2 * | 6/2006 | Schmidt | 475/5 |
| 7,282,003 | B2 * | 10/2007 | Klemen et al. | 475/5 |
| 7,462,121 | B2 * | 12/2008 | Janson et al. | 475/5 |
| 7,540,823 | B2 * | 6/2009 | Kilian et al. | 477/3 |
| 7,611,433 | B2 * | 11/2009 | Forsyth | 475/5 |
| 8,055,415 | B2 * | 11/2011 | Belmont et al. | 701/53 |
| 2002/0033059 | A1 | 3/2002 | Pels et al. | |
| 2002/0088290 | A1 | 7/2002 | Bowen | |
| 2002/0189397 | A1 | 12/2002 | Sakamoto et al. | |
| 2005/0139035 | A1 | 6/2005 | Lee et al. | |

(Continued)

FOREIGN PATENT DOCUMENTS

| | | |
|---|---|---|
| DE | 3525107 | 2/1986 |
| DE | 4204384 | 8/1993 |

(Continued)

OTHER PUBLICATIONS

European Search Report for European Application No. EP10152935; European Patent Office, Munich, Apr. 20, 2010.

(Continued)

*Primary Examiner* — John Walters
*Assistant Examiner* — Brian Swenson
(74) *Attorney, Agent, or Firm* — Bryan A. Santarelli; Graybeal Jackson LLP

(57) ABSTRACT

An embodiment of a road vehicle with hybrid propulsion including: at least one pair of driving wheels; a thermal internal combustion engine; a double clutch gearbox provided with two primary shafts, two clutches interposed between the thermal internal combustion engine and the primary shafts, at least a secondary shaft constantly meshing with the driving wheels, and a plurality of pairs of gears, each of them defining a respective speed and comprising a primary gear mounted to a primary shaft and a secondary gear which is mounted to the secondary shaft and constantly meshes with the primary gear; a first reversible electric machine having a shaft, which is connected to a first primary shaft of the gearbox; and a second reversible electric machine having a shaft, which is mechanically connected to a second primary shaft of the gearbox different from the first primary shaft.

14 Claims, 10 Drawing Sheets

(56) References Cited

U.S. PATENT DOCUMENTS

| | | | |
|---|---|---|---|
| 2006/0130601 A1* | 6/2006 | Hughes | 74/340 |
| 2007/0199397 A1* | 8/2007 | Maten et al. | 74/340 |
| 2008/0141973 A1* | 6/2008 | Shkolnik et al. | 123/234 |
| 2008/0142283 A1 | 6/2008 | Kluge et al. | |

FOREIGN PATENT DOCUMENTS

| | | |
|---|---|---|
| DE | 10129067 | 12/2002 |
| DE | 102005004207 | 8/2006 |
| DE | 102005049992 | 4/2007 |
| DE | 102006059664 | 7/2007 |
| EP | 0335086 | 10/1989 |
| EP | 1097831 | 5/2001 |
| FR | 2898853 | 9/2007 |

OTHER PUBLICATIONS

Italian Search Report for Italian Application Serial No. BO20090061, Munich, Aug. 6, 2009.

* cited by examiner

ROAD VEHICLE WITH HYBRID PROPULSION

PRIORITY CLAIM

The instant application claims priority to Italian Patent Application No. BO2009A000061, filed Feb. 9, 2009, which application is incorporated herein by reference in its entirety.

TECHNICAL FIELD

An embodiment of the present invention relates to a road vehicle with hybrid propulsion.

BACKGROUND

A hybrid vehicle comprises an internal combustion engine, which transmits power to the driving wheels by means of a transmission provided with a gearbox, and at least one electric machine which is electrically connected to an electric storage system and mechanically connected to the driving wheels.

The following is possible while traveling: either a thermal working mode, in which the torque is generated only by the combustion engine and the electric machine possibly acts as a generator for recharging the electric storage system; or an electric working mode, in which the internal combustion engine is off and the torque is generated only by the electric machine working as a motor; or by a combined working mode, in which the torque is generated both by the combustion engine and by the electric machine working as a motor. Furthermore, in order to increase the overall energy efficiency during all deceleration steps, the electric machine may be used as a generator for carrying out a regenerative deceleration in which the kinetic energy possessed by the vehicle is partially converted into electric energy, which is stored in the electric storage system, instead of being fully dissipated in frictions.

The arrangement of the electric machine within the vehicle and thus the mechanical connection of the electric machine to the driving wheels may be very complex in an existing vehicle, as in an existing vehicle which was not specifically designed for hybrid traction, finding the space required for accommodating the electric machine is generally very difficult. Therefore, modifying an existing vehicle to make the vehicle itself hybrid is often impossible; such a limitation is particularly serious, because it does not allow to produce a hybrid vehicle from an existing vehicle of conventional type, but requires a completely new design of the hybrid vehicle. Therefore, the design and development costs of a hybrid vehicle are often very high, thus making the hybrid vehicle marketing not so profitable.

US2005139035A1, US2002033059A1, US2008142283A1, DE102005004207A1 and DE102006059664A1, which are incorporated herein by reference in their entireties, describe a double clutch transmission for a hybrid vehicle, wherein one of the two primary shafts of the double clutch transmission is angularly integral with the rotor of a reversible electric machine.

EP1097831A2, which is incorporated herein in its entirety, describes a road vehicle with hybrid propulsion including: a couple of driving wheels; a thermal internal combustion engine; a gearbox provided with a primary shaft, a first clutch interposed between the thermal internal combustion engine and the primary shaft, a secondary shaft constantly meshing with the driving wheels, and a plurality of couples of gears, each of which defines a respective speed and comprises a primary gear mounted to a primary shaft and a secondary gear which is mounted to the secondary shaft and constantly meshes with the primary gear; a reversible electric machine having a shaft, which is connected to the primary shaft of the gearbox; and an auxiliary mechanism provided with a rotatably mounted shaft which takes the movement from the primary shaft.

SUMMARY

An embodiment of the present invention is a road vehicle with hybrid propulsion, which is free from the above-described drawbacks while being easy and cost-effective to be manufactured.

BRIEF DESCRIPTION OF THE DRAWINGS

One or more embodiments of the present invention will now be described with reference to the accompanying drawings, which are non-limitative, in which.

DETAILED DESCRIPTION

Figure 1:
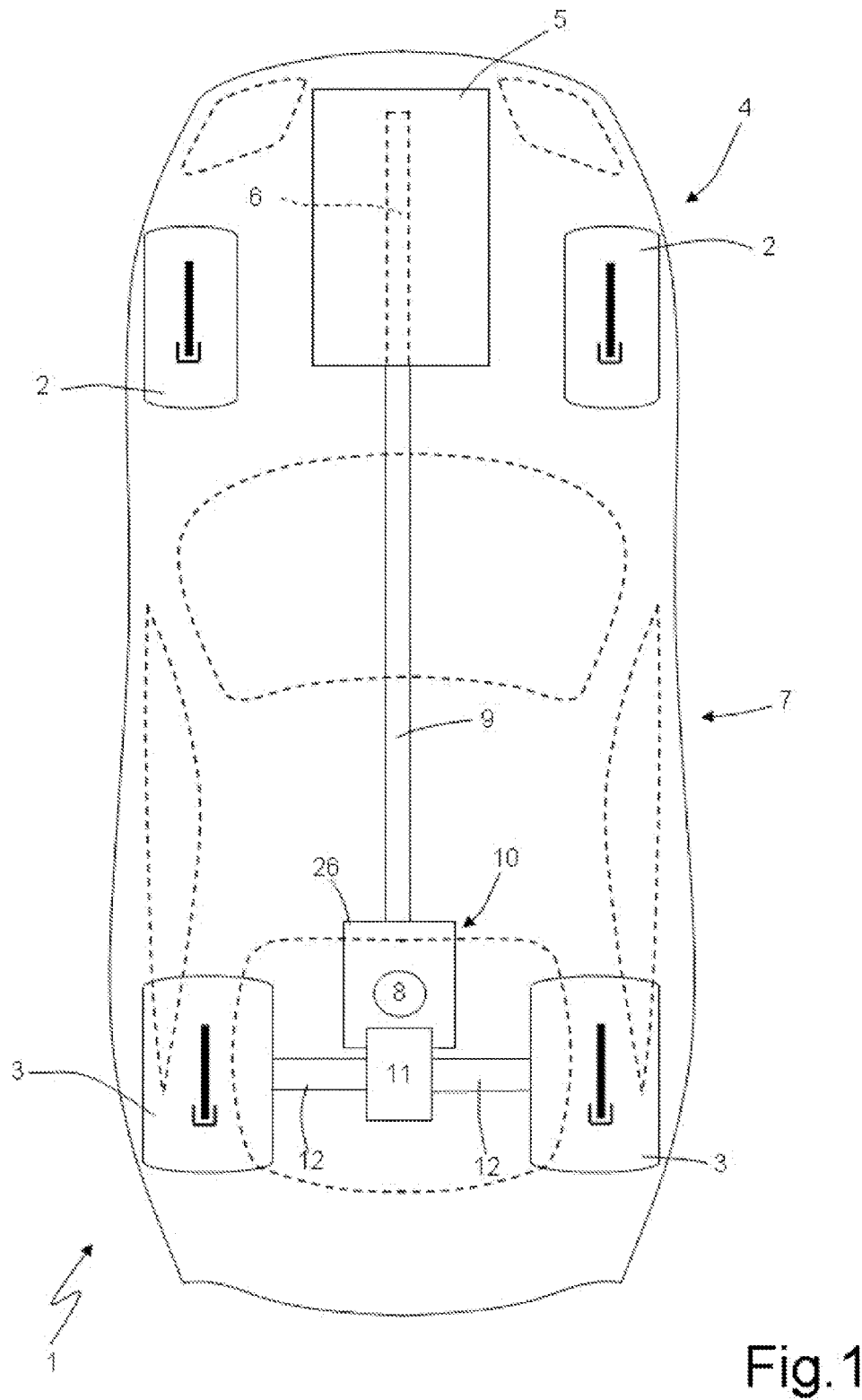
FIG. 1 is a diagrammatic view of an embodiment of a road vehicle with hybrid propulsion.

In FIG. 1, numeral 1 indicates as a whole an embodiment of a road vehicle with hybrid propulsion provided with two front wheels 2 and two rear driving wheels 3, which receive the torque from a hybrid propulsion system 4.

The hybrid propulsion system 4 comprises a thermal internal combustion engine 5, which is arranged in a front position and is provided with a drive shaft 6, a servo-controlled transmission 7, which transmits the torque generated by the internal combustion engine 5 to the rear driving wheels 3, and a reversible electric machine 8 (i.e. which may work either as an electric motor, by absorbing electricity and generating a mechanical torque, and as an electric generator, by absorbing mechanical energy and generating electricity) which is mechanically connected to the servo-controlled transmission 7.

The servo-controlled transmission 7 comprises a propeller shaft 9 which is angularly integral with the drive shaft 6 at one end, and is mechanically connected to a double clutch, servo-controlled gearbox 10 at the other end, which gearbox is arranged in a rear position and transmits the movement to the rear driving wheels 3 by means of two axles shafts 12, which receive the movement from a differential 11. The reversible electric machine 8 is mechanically connected to the double clutch gearbox 10, as will be described in greater detail below, and is driven by an electronic power converter 13 connected to an electric storage system 14, typically consisting of a pack of chemical batteries possibly connected in parallel to one or more super-capacitors.

Figure 2:
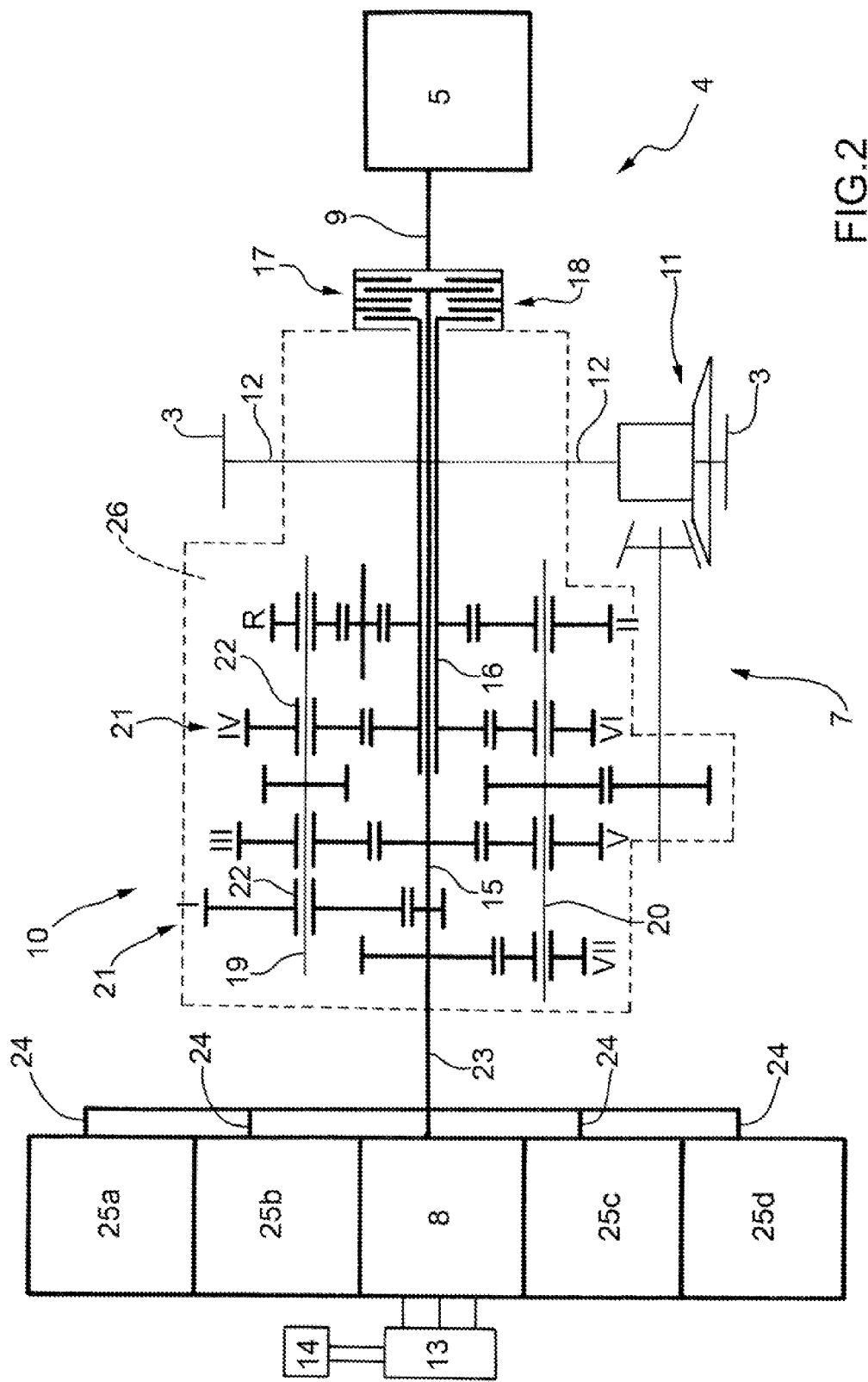
FIG. 2 is a diagrammatic view of an embodiment of a hybrid propulsion system of the road vehicle in FIG. 1.

As shown in FIG. 2, the double clutch gearbox 10 comprises two mutually coaxial, independent primary shafts 15 and 16, inserted within each other, and two coaxial clutches 17 and 18 arranged in series, each of which is adapted to connect a respective primary shaft 15 or 16 to the transmission shaft 9 (and thus to the drive shaft 6 of the thermal internal combustion engine 5). Furthermore, the double clutch gearbox 10 comprises two secondary shafts 19 and 20, which are both angularly integral with the inlet of differential 11 which transmits the movement to the rear driving wheels 3.

The double clutch gearbox 10 shown in FIG. 2 has seven forward gears indicated by Roman numerals (first gear I, second gear II, third gear III, fourth gear IV, fifth gear V, sixth gear VI and seventh gear VII) and one reverse gear (indicated by the letters Rw). The primary shafts 15 and 16 are mechanically coupled to the secondary shafts 19 and 20 by means of a plurality of couples of gears 21, each of which defines a respective speed, and comprises a primary gear mounted to a primary shaft 15 or 16, and a secondary gear which is mounted to a secondary shaft 19 or 20 and constantly meshes the primary gear. In order to allow the correct operation of the double clutch gearbox 10, all the odd gears (first gear I, third gear III, fifth gear V, seventh gear VII) are coupled to the same primary shaft 15, while all the even gears (second gear II, fourth gear IV, and sixth gear VI) are coupled to the other primary shaft 16.

Each primary gear 8 is keyed onto a respective primary shaft 15 or 16 to rotate, again integrally, with the primary shaft 15 or 16 itself, and constantly meshes with the respective secondary gear; instead, each secondary gear is idly mounted to the respective secondary shaft 19 or 20. For each couple 21 of gears, the double clutch gearbox 10 comprises a corresponding synchronizer 22, which is mounted coaxially to the corresponding secondary shaft 19 or 20 and is adapted to be actuated for engaging the respective secondary gear of the secondary shaft 19 or 20 (i.e. for making the respective gear angularly integral with the secondary shaft 19 or 20).

The electric machine 8 has a shaft 23, which is constantly connected to the primary shaft 15. Furthermore, the shaft 23 of the electric machine 8 is constantly connected to the rotatably mounted shafts 24 of a series of fluido-dynamic rotary machines 25, which supply auxiliary services to the road vehicle 1; therefore, the shafts 24 of the fluido-dynamic machines 25 again rotate synchronously with the shaft 23 of the reversible electric machines 8.

According to the embodiment shown in FIG. 2, the fluido-dynamic machines 25 (pneumatic, hydraulic or oil hydraulic machines) of the auxiliary services and angularly integral with the shaft 23 of the electric machine 8 are a pump 25a of an oil hydraulic circuit of a hydraulically-assisted steering circuit (i.e. of the power steering), a compressor 25b of the climate control system, a pump 25c of a cooling circuit, and a pump 25d of an oil hydraulic service circuit. Pump 25a of the oil hydraulic circuit of the hydraulically-assisted steering system is operated to pressurize the oil hydraulic circuit of the hydraulically-assisted steering, compressor 25b of the climate control system is used to cool and dehumidify the air which is introduced into the passenger compartment (in particular, by compressing a cooling fluid which is then expanded to subtract heat from the air which is introduced into the passenger compartment), the cooling circuit pump 25c is operated to make a cooling fluid (typically water) circulate through the thermal internal combustion engine 5 and through the radiators, and pump 25d of the oil hydraulic service circuit is operated to pressurize the oil hydraulic service circuit, which is used by the oil hydraulic actuators of the road vehicle 1 (the oil hydraulic actuators of the double clutch gearbox 10, possible oil hydraulic actuators coupled to the suspensions to adjust the standing height of the road vehicle 1, possible oil hydraulic actuators of a sunroof of the road vehicle 1).

According to an embodiment, starting from the existing double clutch gearbox 10 not initially designed for hybrid traction, the primary shaft 15 is elongated from the opposite side with respect to the clutches 17 and 18 so as to protrude from a gearbox casing 26; therefore, outside the gearbox casing 26, the primary shaft 15 is made angularly integral (e.g. by means of a butt-coupling) to the shaft 23 of the electric machine 8. The shafts 24 of the fluido-dynamic machines 25 of the auxiliary services are made angularly integral with the shaft 23 of the electric machine 8 by means of belt or chain transmissions.

Figure 3:
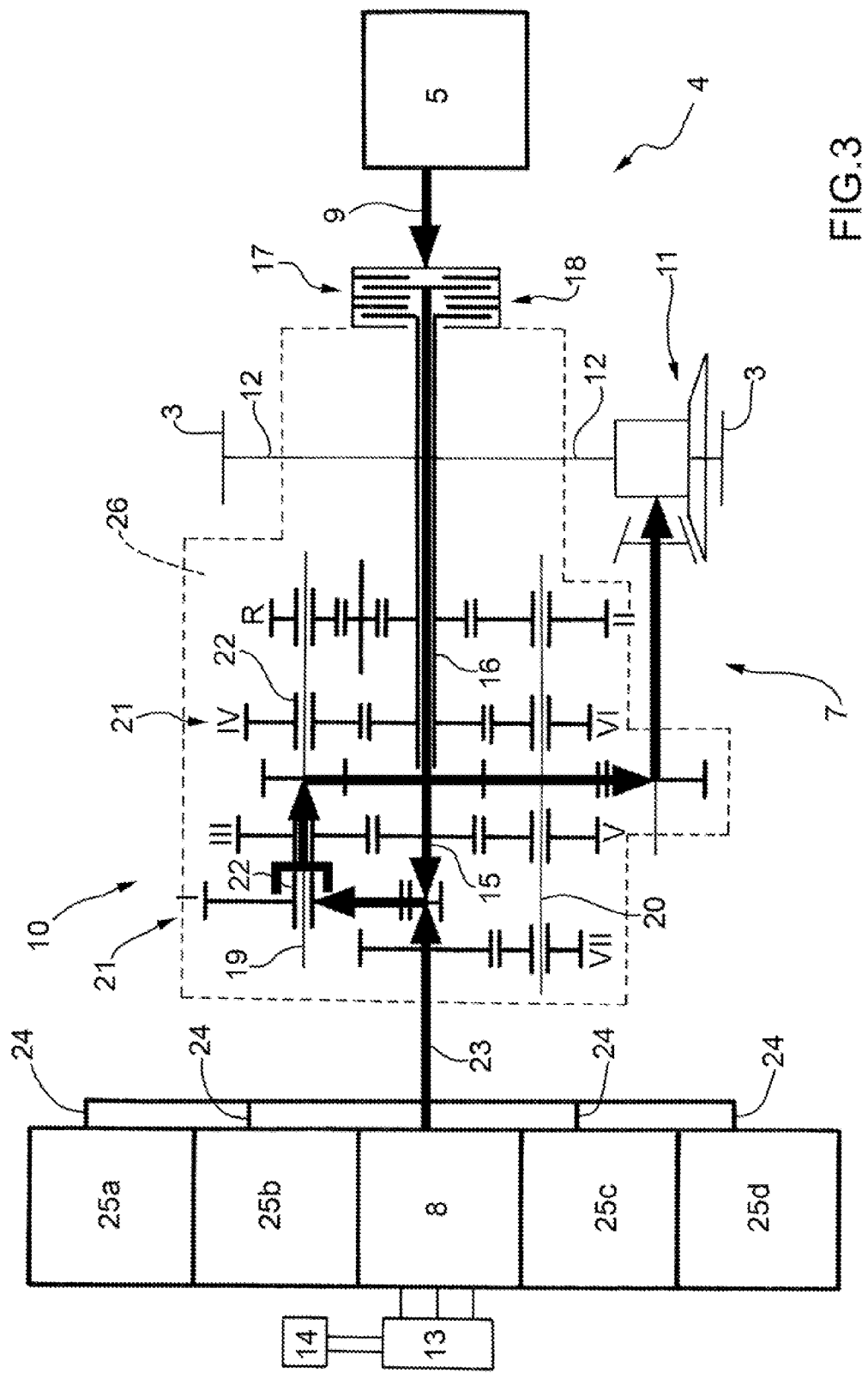
FIG. 3 is a diagrammatic view of the hybrid propulsion system in FIG. 2 in which an embodiment of the route of the torque supplied by the thermal internal combustion engine and by the electric machine when an odd gear is engaged is highlighted.

FIG. 3 shows a diagrammatic view of the hybrid propulsion system 4 highlighting the route of the torque $T_t$ supplied by the thermal internal combustion engine 5 and, if present, the route of the torque $T_e$ supplied by the electric machine 8 when an odd gear is engaged in the double clutch gearbox 10 (in particular, the first gear 1, as shown in FIG. 3). In this condition, the thermal internal combustion engine 5 is connected to the primary shaft 15 by means of the clutch 17 which is closed (while clutch 18 is open); the thermal internal combustion engine 5 and the electric machine 8 are both connected to the primary shaft 15 which transmits the movement to the secondary shaft 19 by means of the couple of gears 21 of the currently engaged odd gear (i.e. the corresponding secondary gear is made integral with the secondary shaft 19 by means of the synchronizer 22 thereof).

Figure 4:
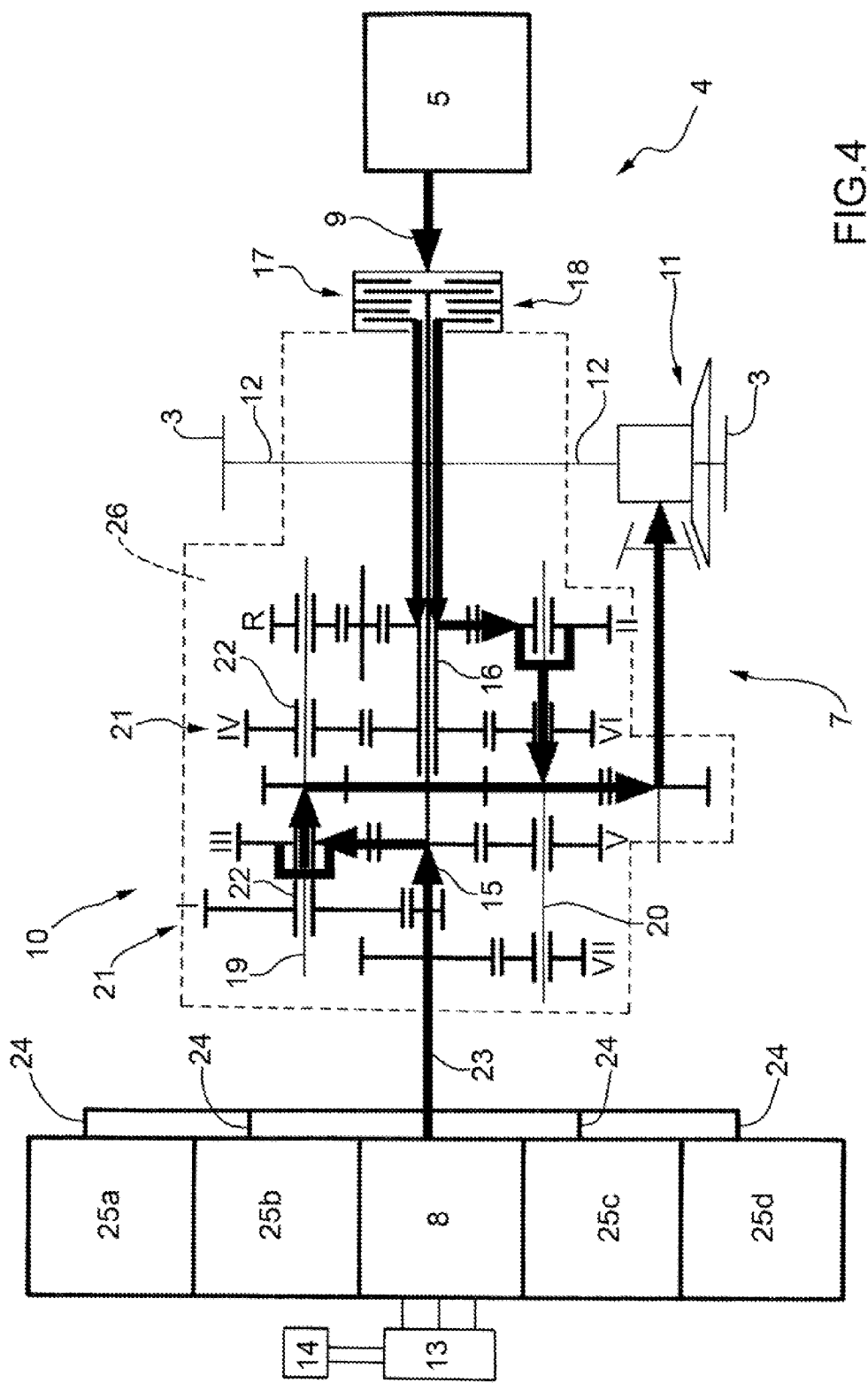
FIG. 4 is a diagrammatic view of the hybrid propulsion system in FIG. 2 in which an embodiment of the route of the torque supplied by the thermal internal combustion engine and by the electric machine when an even gear is engaged is highlighted.

FIG. 4 shows a diagrammatic view of the hybrid propulsion system 4 highlighting the route of the torque $T_t$ supplied by the thermal internal combustion engine 5 and, if present, the route of the torque $T_e$ supplied by the electric machine 8 when an even gear is engaged in the double clutch gearbox 10 (in particular, the second gear 2 as shown in FIG. 4). In this condition, the thermal internal combustion engine 5 is connected to the primary shaft 16 by means of the clutch 18 which is closed (while clutch 17 is open) and the primary shaft 16 transmits the movement to the secondary shaft 20 by means of the couple of gears 21 of the currently engaged even gear (i.e. the corresponding secondary gear is made integral with the secondary shaft 20 by means of the synchronizer 22 thereof). Instead, the electric machine 8 is connected to the primary shaft 15, which transmits the movement to the secondary shaft 19 by means of the couple of gears 21 of a currently engaged odd gear (i.e. the corresponding secondary gear is made integral with the secondary shaft 19 by means of the synchronizer 22 thereof). In other words, in this circumstance, both an even gear for connecting the thermal internal combustion engine 5 to the rear driving wheels, and an odd gear for connecting the electric machine 8 to the rear driving wheels 3 are engaged. The odd gear which is engaged is also chosen according to the current rotation speed of the secondary shaft 19 (which depends on the rotation speed of the rear driving wheels 3), so as to maintain the rotation speed of the electric machine 8 in an optimal range; typically, the higher the current rotation speed of the secondary shaft 19 (i.e. the higher the speed of the road vehicle 1), the higher the order of the odd gear which is engaged.

As shown in FIGS. 3 and 4, both the thermal internal combustion engine and the electric machine 8 supply a positive torque $T_t$ and $T_e$; in other circumstances, the electric machine 8 could absorb a resistant torque $T_e$, which is used to generate electricity (typically when the battery 14 needs to be recharged), or the thermal internal combustion engine 5 could absorb a resistant sustaining torque $T_t$ (typically when the thermal internal combustion engine 5 works in cut-off).

Figure 5:
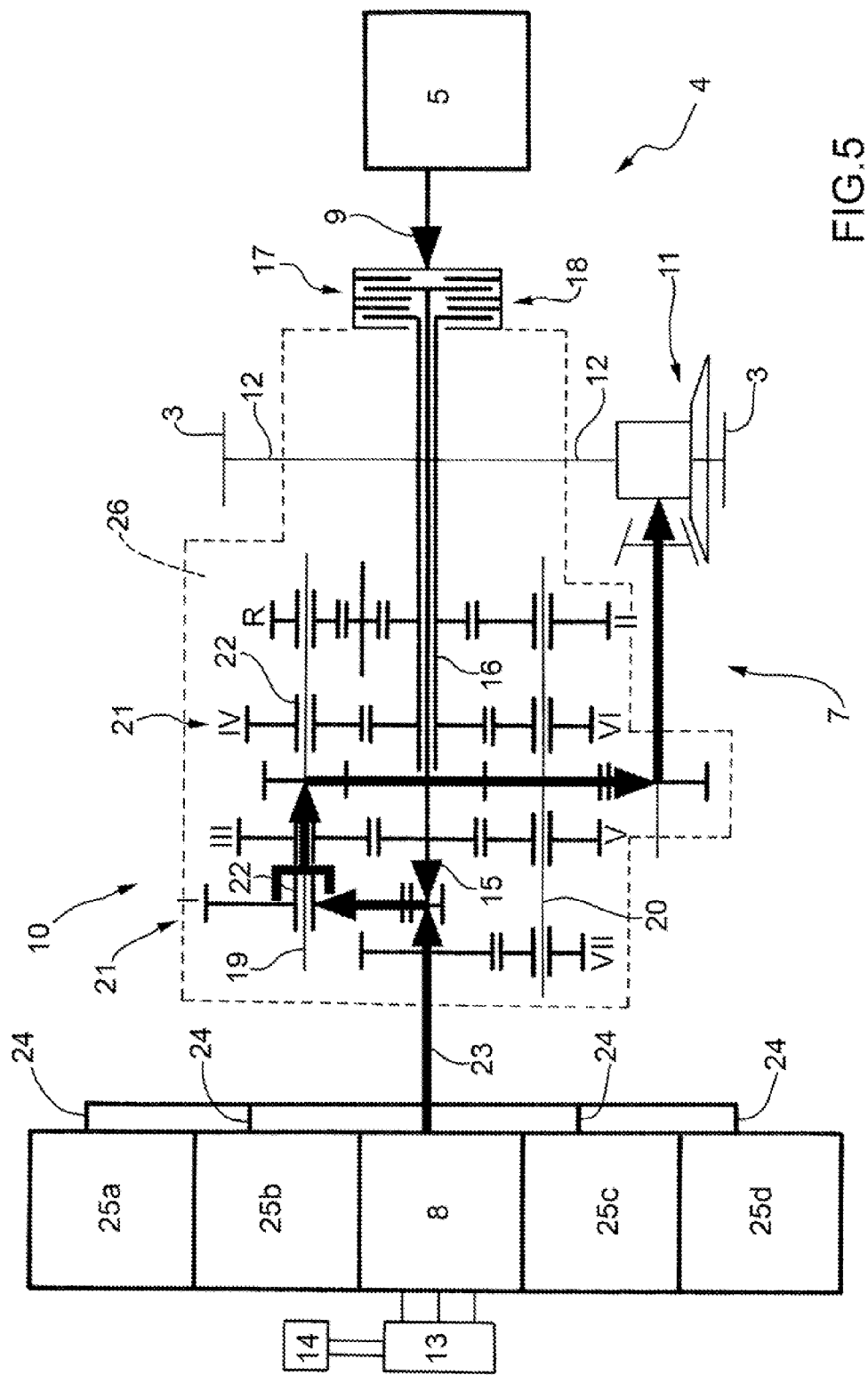
FIG. 5 is a diagrammatic view of the hybrid propulsion system in FIG. 2 in which an embodiment of the route of the torque supplied by the electric machine working as a vehicle traction motor is highlighted.

FIG. 5 shows a diagrammatic view of the hybrid propulsion system 4 highlighting the route of the torque $T_e$ supplied by the electric machine 8 in electric traction only. In this circumstance, the thermal internal combustion engine 5 is off and disconnected from the primary shafts 15 and 16 and only the electric machine 8 is connected to the rear driving wheels 3 by engaging an odd gear; in other words, the electric machine 8 is connected to the primary shaft 15 which transmits the movement to the secondary shaft 19 by means of the couple of gears 21 of the currently engaged odd gear (i.e. the corresponding secondary gear is made integral with the secondary shaft 19 by means of the synchronizer 22 thereof). Also in this circumstance, the odd gear which is engaged is chosen according to the current rotation speed of the secondary shaft 19 (which depends on the rotation speed of the rear driving wheels 3), so as to maintain the rotation speed of the electric machine 8 in an optimal range; if required, the odd gear engaged could be varied to maintain the rotation speed of the electric machine 8 in an optimal range. In the above-described case of electric traction only, both clutches 17 and 18 could be closed or clutch 18 could be closed when the primary shaft 16 is idle (i.e. mechanically isolated from the secondary shafts 19 and 20) to reduce friction losses which occur in clutch 18 if the clutch 18 itself is in an oil bath.

Figure 6:
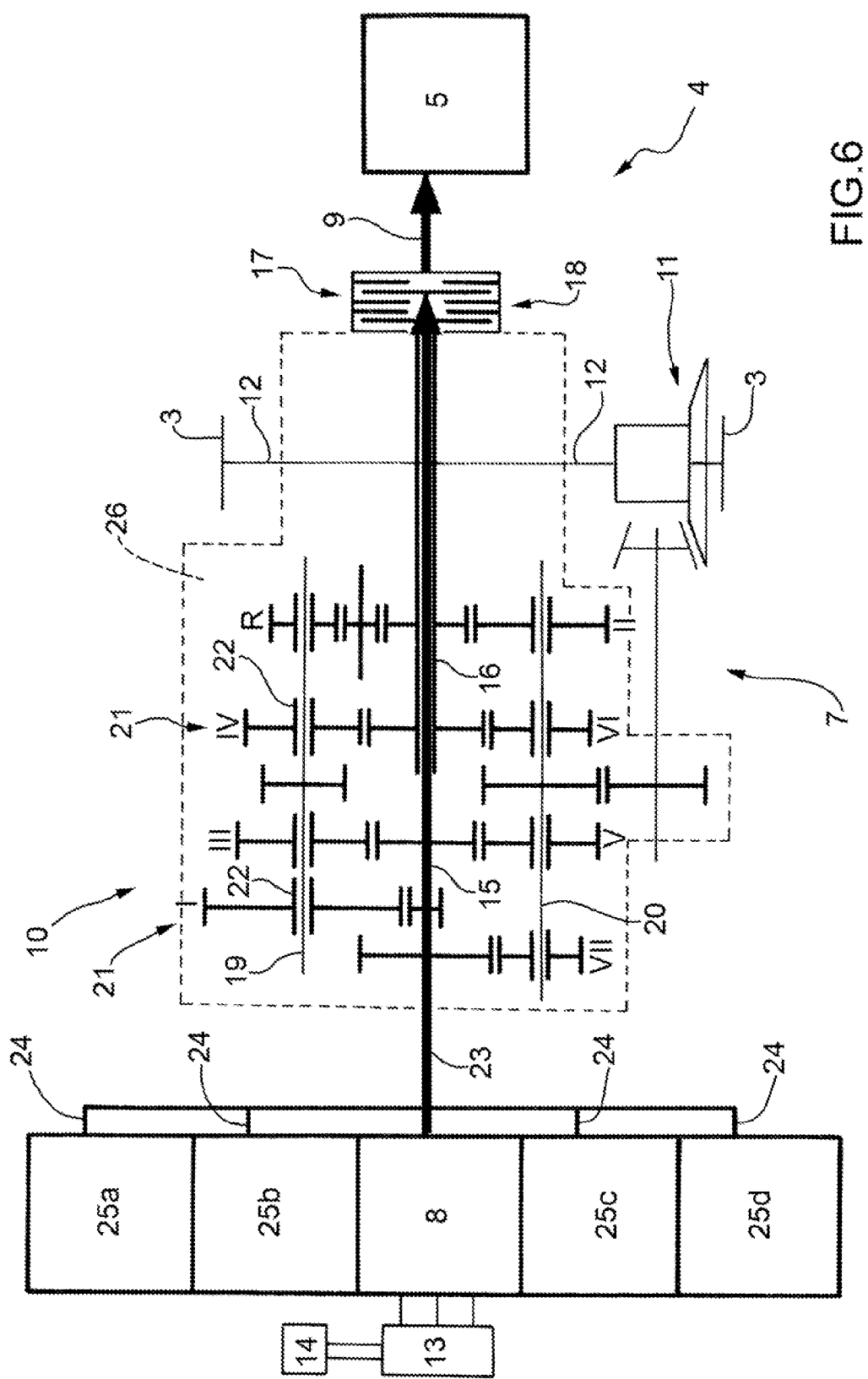
FIG. 6 is a diagrammatic view of the hybrid propulsion system in FIG. 2 in which an embodiment of the route of the torque supplied by the electric machine working as a motor for starting the thermal internal combustion engine is highlighted.

FIG. 6 diagrammatically shows a hybrid propulsion system 4 highlighting the route of the torque $T_e$ supplied by the electric machine 8 working as a motor for starting the thermal internal combustion engine 5. In this circumstance, all gears of the double clutch gearbox 10 are disengaged and the clutch 17 is closed (while clutch 18 is open) to connect the electric machine 8 to the thermal internal combustion engine 5 without transmitting any movement to the rear driving wheels 3. The above-described method of starting the thermal internal combustion engine 5 is used when the thermal internal combustion engine 5 needs to be started while maintaining the road vehicle 1 stationary; if instead the thermal internal combustion engine 5 is started while the road vehicle 1 is moving (e.g. while starting up at a traffic light), the road vehicle 1 may travel by a merely electric traction as described above with reference to FIG. 5, and then the drive shaft 6 of the thermal internal combustion engine 5 may be connected to the electric machine 8 and to the rear driving wheels 3 (as previously described with reference to FIG. 2 or 3), so as to make the drive shaft 6 rotate thus determining the start-up of the thermal internal combustion engine 5.

Figure 7:
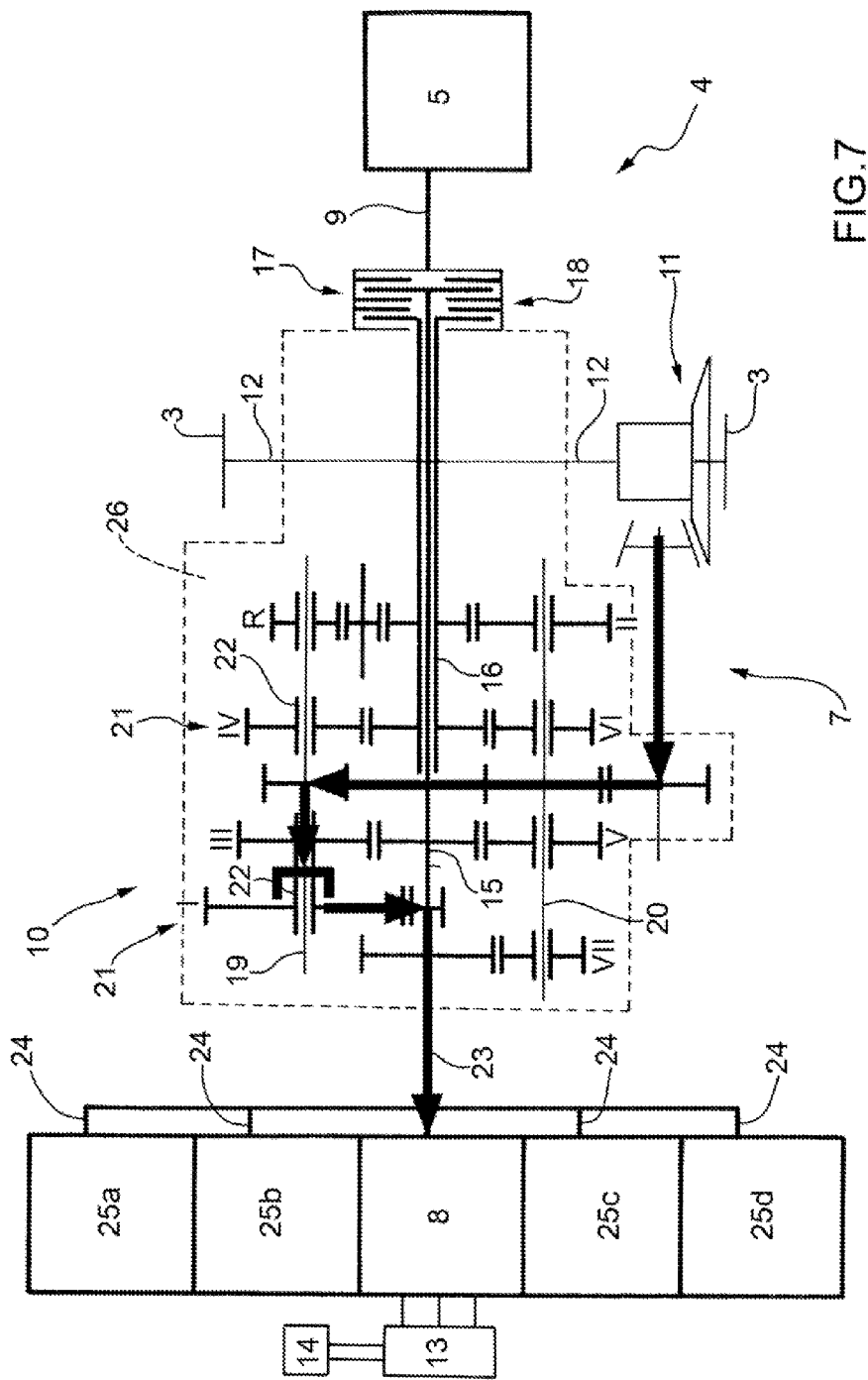
FIG. 7 is a diagrammatic view of the hybrid propulsion system in FIG. 2 in which an embodiment of the route of the braking torque absorbed by the electric machine during a regenerative braking is highlighted.

FIG. 7 shows a diagrammatic view of the hybrid propulsion system 4 highlighting the route of the braking torque $T_e$ absorbed by the electric machine 8 working as a generator during a regenerative braking. In this circumstance, the electric machine 8 is connected to the rear driving wheels 3 by engaging an odd gear; in other words, the electric machine 8 is connected to the primary shaft 15 which receives the movement from the secondary shaft 19 by means of the couple of gears 21 of the currently engaged odd gear (i.e. the corresponding secondary gear is made integral with the secondary shaft 19 by means of the synchronizer 22 thereof). In this circumstance, if the thermal internal combustion engine 5 is off, then both clutches 17 and 18 are open, while if the thermal internal combustion engine 5 is on, then one of the two clutches 17 and 18 is closed to transmit a resistant sustaining torque $T_t$ to the thermal internal combustion engine 5 (as described in detail above with regards to FIGS. 3 and 4).

Figure 8:
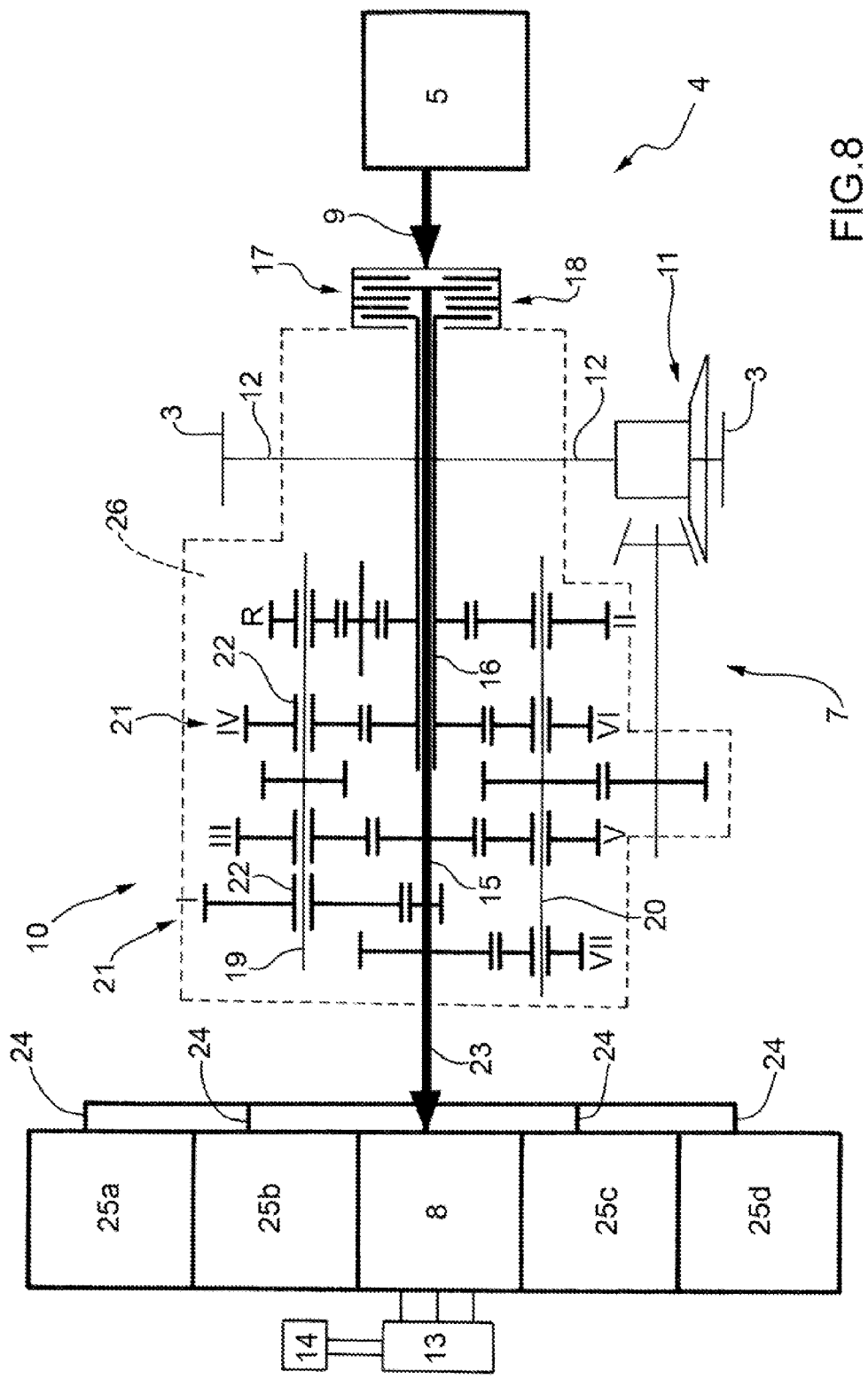
FIG. 8 is a diagrammatic view of the hybrid propulsion system in FIG. 2 in which an embodiment of the route of the torque supplied by the thermal internal combustion engine when the road vehicle is stationary and the gearbox is in neutral is highlighted.

FIG. 8 shows a diagrammatic view of the hybrid propulsion system 4 highlighting the route of the torque $T_t$ supplied by the thermal internal combustion engine 5 when the road vehicle 1 is stationary and the gearbox 10 is in neutral. In this circumstance, all gears of the double clutch gearbox 10 are disengaged and the clutch 17 is closed (while clutch 18 is open) to connect the electric machine 8 to the thermal internal combustion engine 5 without transmitting any movement to the rear driving wheels 3.

In the above-described operating modes, the fluido-dynamic machines 25 of the auxiliary services are normally dragged by the electric machine 8 working as a motor; when the electric machine 8 works as a generator, the fluido-dynamic machines 25 of the auxiliary services and the electric machine 8 are dragged either by the thermal internal combustion engine 5 or by the rear driving wheels 3, thus exploiting the kinetic energy of the road vehicle 1. In particular, during the regenerative braking shown in FIG. 7, the braking torque applied to the rear driving wheels 3 is given by the sum of the torque absorbed by the fluido-dynamic machines 25 of the auxiliary services for their working and of the torque absorbed by the electric machine 8 working as a generator. In order to maximize the braking torque applied to the rear driving wheels 3 (obviously according to the driver's wishes expressed by pressing the braking pedal of the braking system), during the regenerative braking, the fluido-dynamic machines 25 of the auxiliary services are driven to maximize, compatibly with the surrounding conditions, the torque absorbed for their working; during the regenerative braking, for example, the pump 25a of the oil hydraulic circuit of the hydraulically-assisted steering circuit is driven to increase (if possible) the oil pressure in a corresponding hydraulic storage, the pump 25d of the oil hydraulic service circuit is driven to increase (if possible) the oil pressure in a corresponding hydraulic storage, and if appropriate according to the external climatic conditions, the compressor 25b of the climate control system is driven to decrease (if possible) the temperature of a refrigerating fluid.

In other words, within the possible limits, the fluido-dynamic machines 25 of the auxiliary services are operated at best during the regenerative braking and are turned off during the other working modes; thereby, during the regenerative braking, the braking torque is always absorbed by the fluido-dynamic machines 25 of the auxiliary services which are operated at best (again within the possible limits) and, if required, it is also absorbed by the electric machine 8 which is run as a generator. Therefore, the braking torque required during the regenerative braking is firstly absorbed by the fluido-dynamic machines 25, and only when the capacity of the fluido-dynamic machines 25 has been saturated, it is also absorbed by the electric machine 8, which is run as a generator. Such an operative mode is particularly efficient because the kinetic energy of the road vehicle 1 is directly used by the fluido-dynamic machines 25 of the auxiliary services instead of being firstly converted into electricity and then converted back into mechanical energy; exploiting the mechanical energy without passing through the two-fold electric conversion has a much higher energy efficiency.

According to an embodiment shown in the accompanying FIGS., the shaft 23 of the electric machine 8 is constantly connected to the primary shaft 15 of the gearbox 10 and is never separated from the primary shaft 15 itself; according to another embodiment (not shown), a clutch which is normally always closed and is opened only for safety reasons when the rotation of the electric machine 8 is to be stopped to suppress the electricity at the ends of the terminals of the electric machine 8 itself, is interposed between the shaft 23 of the electric machine 8 and the primary shaft 15 of the gearbox 10. In other words, when the rotor of the electric machine 8 has permanent magnets and is rotated, it determines the generation of an electric voltage at the ends of the stator terminals; in some circumstances (typically during repairs or servicing at the garage), such an electrical voltage could be dangerous and therefore to avoid the generation of such a voltage, the shaft 23 of the electric machine 8 is to be physically separated from the primary shaft 15 of the gearbox 10 by means of the corresponding clutch. The clutch interposed between the shaft 23 of the electric machine 8 and the primary shaft 15 of the gearbox 10 may be arranged either downstream or upstream of the movement take-offs towards the shafts 24 of the fluido-dynamic machines 25; in other words, opening such a clutch may determine the disconnection of the shafts 24 of the fluid-dynamic machines 25 from the shaft 23 of the electric machine 8, thus leaving the shafts 24 connected to the primary shaft 15 of the gearbox 10, or it may determine the disconnection of the shafts 24 of the fluido-dynamic machines 25 to the primary shaft 15 of the gearbox 10 thus leaving the shafts 24 connected to the shaft 23 of the electric machine 8.

Figure 9:
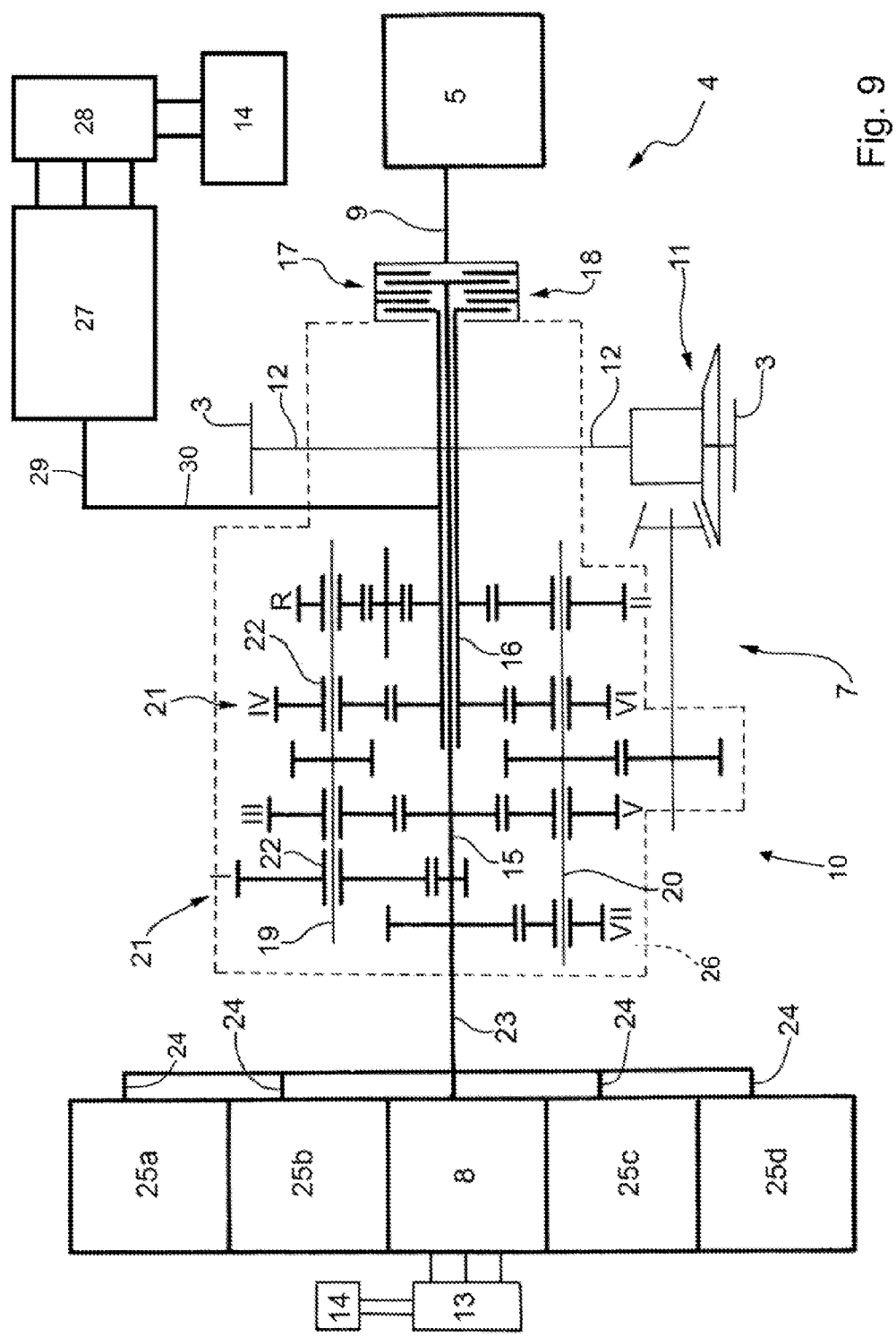
FIG. 9 is a diagrammatic view of a different embodiment of the hybrid propulsion system in FIG. 2.

In another embodiment shown in FIG. 9, the hybrid propulsion system 4 comprises a further reversible electric machine 27 (i.e. which may work both as an electric motor by absorbing electricity and generating a mechanical torque, and as an electric generator by absorbing mechanical energy and generating electricity) which is mechanically connected to the servo-controlled transmission 7. The reversible electric machine 27 is also mechanically connected to the double clutch gearbox 10 and is driven by an electronic power converter 28 connected to the electric storage system 14; in particular, the electric machine 27 has a shaft 29, which is mechanically connected to the primary shaft 16 by means of a mechanical transmission 30 (consisting of a gear cascade, for example).

The electric machine 27 may be used either as a motor or as a generator.

The electric machine 27 may be used as a generator by absorbing mechanical power from the thermal engine 5 by means of the clutch 18 which is closed in this condition; in this case, all the mechanical power generated by the thermal engine 5 is absorbed by the electric machine 27, or part of the mechanical power generated by the thermal engine 5 is also transferred to the rear driving wheels 3 either by means of an even gear associated with the primary shaft 16 or by means of an odd gear associated with the primary shaft 15 (in the latter case all even gears associated with the primary shaft 16 are disengaged, the clutch 18 is closed, and an odd gear associated with the primary shaft 15 is engaged).

A hybrid working mode of the "serial" type occurs when the thermal engine 5 only rotates the electric machine 27 working as a generator, while the torque transferred to the rear driving wheels 3 is only generated by the electric machine 8 working as a motor, which is directly electrically powered by the electric machine 27 working as a generator. The hybrid operation of the "serial" type may also be obtained by reversing the operating mode of the two electric machines 8 and 27, and by reversing also the operations of opening/closing the two clutches 17 and 18; in other words, the thermal engine 5 rotates only the electric machine working as a generator, while the torque transmitted to the rear driving wheels is only generated by the electric machine 27 working as a motor which is directly electrically powered by the electric machine 8 working as a generator.

Alternatively, the electric machine 27 may be used as a generator by absorbing mechanical power from the rear driving wheels 3 (thus providing a regenerative braking); in this case, an even gear associated with the primary shaft 16 is engaged, while the clutch 18 may be either open or closed. In this case, both electric machines 8 and 27 may work as a generator by absorbing mechanical power from the rear driving wheels 3 (thus providing a regenerative braking): the electric machine 8 absorbs mechanical power from the rear driving wheels 3 by means of an odd gear associated with the primary shaft 15, while the electric machine 27 absorbs mechanical power from the rear driving wheels 3 by means of an even gear associated with the primary shaft 16.

The electric machine 27 may be used as a motor by supplying torque to the thermal engine 5 (only for starting the thermal engine 5 itself); in this case, the clutch 18 is closed and all even gears associated with the primary shaft 16 are typically disengaged. Alternatively, the electric machine 27 may be used as a motor by supplying a torque to the rear driving wheels 3; in this case, the clutch 18 may be either open or closed and at least one of the even gears associated with the primary shaft 16 is engaged.

Figure 10:
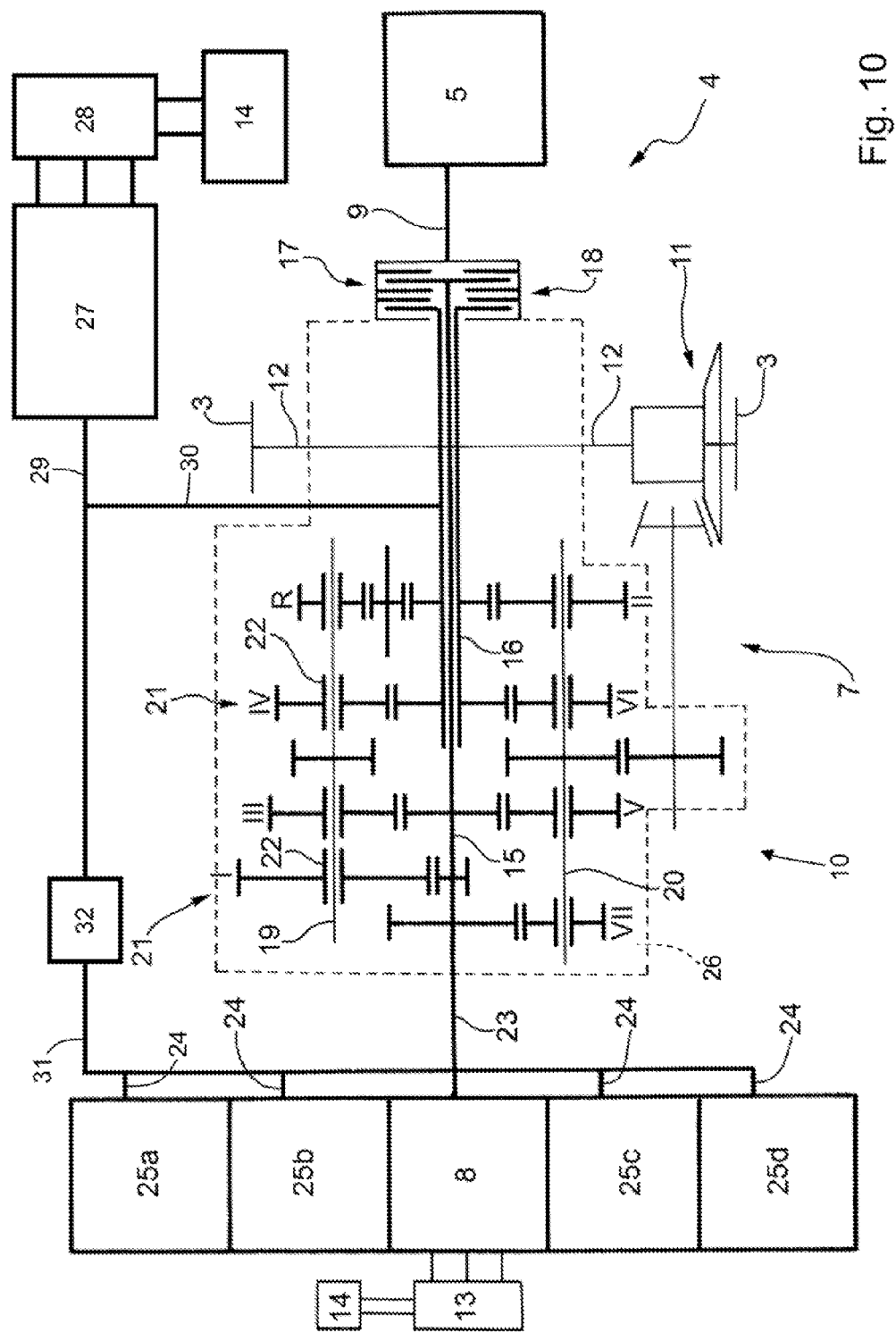
FIG. 10 is a diagrammatic view of a variant of the hybrid propulsion system in FIG. 9.

According to an embodiment shown in FIG. 10, the shaft 29 of the electric machine 27 is mechanically connected both to the primary shaft 16 by means of the mechanical transmission 30, and to the shafts 24 of the rotary fluido-dynamic machines 25 which supply the auxiliary services by means of a mechanical transmission 31 (e.g. consisting of a gear cascade or a belt). The mechanical transmission 31 comprises an uncoupling device 32 (comprising, for example, a clutch or an idle wheel), which allows separating the shaft 29 of the electric machine 27 from the shafts 24 of the rotary fluido-dynamic machines 25 to avoid rigidly restraining the electric machine 8 to the electric machine 27; instead of being inserted between the shaft 29 of the electric machine 27 and the shafts 24 of the rotary fluido-dynamic machines 25, the uncoupling device 32 could possibly be inserted between the shaft 23 of the electric machine 8 and the shafts 24 of the rotary fluido-dynamic machines 25.

An embodiment of the above-described road vehicle 1 has many advantages because it is simple and cost-effective to be implemented, having a double clutch gearbox 10 structurally similar to a standard double clutch gearbox (and thus it is simple and cost-effective to be implemented starting from a road vehicle provided with a standard double clutch gearbox). Furthermore, positioning the electric machine 8 is relatively easy even in an existing vehicle which is not designed for hybrid traction. In the road vehicle 1, all electric motor and electric generator functions are carried out by a single electric machine 8. In other words, the road vehicle 1 has only the electric machine 8 which is able to carry out all functions of electric motor and electric generator required onboard with an evident construction simplification.

Moreover, due to an embodiment of the electric machine 8 being connected to the rear driving wheels 3 by means of the transmission ratio of an odd gear, an appropriate odd gear may be selected each time so as to maintain the rotating speed of the electric machine 8 in an optimal range.

Finally, an embodiment of the above-described road vehicle 1 has a high energy efficiency, particularly during regenerative braking operations by virtue of using at least part of the kinetic energy of the road vehicle 1 without passing through an electric conversion. In many circumstances, the shafts 24 of the fluido-dynamic machines 25 of the auxiliary services being permanently connected to the shaft 23 of the electric machine allows stopping the thermal internal combustion engine 5 and preventing it from being dragged in rotation.

From the foregoing it will be appreciated that, although specific embodiments have been described herein for purposes of illustration, various modifications may be made without deviating from the spirit and scope of the disclosure. Furthermore, where an alternative is disclosed for a particular embodiment, this alternative may also apply to other embodiments even if not specifically stated.

The invention claimed is:

1. A road vehicle with hybrid propulsion, the road vehicle comprising:
    at least a couple of driving wheels;
    a thermal internal combustion engine;
    a double clutch gearbox provided with two primary shafts, two clutches interposed between the thermal internal combustion engine and the primary shafts, at least a secondary shaft constantly meshing with the driving wheels, and a plurality gear couples, each of them defining a respective speed and including a primary gear mounted on a primary shaft and a secondary gear which is mounted on the secondary shaft and constantly meshes with the primary gear;
    a first reversible electric machine having a shaft, which is coupled to a first primary shaft of the gearbox;
    a second reversible electric machine having a shaft, which is mechanically coupled to a second primary shaft of the gearbox different from the first primary shaft;
    a plurality of rotary fluid-dynamic machines, each of them to provide for an auxiliary service of the road vehicle and having a rotary mounted shaft to receive movement from the shaft of the first reversible electric machine; and
    a mechanical transmission, which couples the shaft of the second reversible electric machine to the shafts of the fluid-dynamic machines and includes an uncoupling device, which separates the shaft of the second reversible electric machine from the shafts of the fluid-dynamic machines.

2. The road vehicle according to claim 1, wherein during a regenerative braking:
    the fluid-dynamic machines of the auxiliary services and the first reversible electric machine are dragged by the driving wheels to make use of kinetic energy belonging to the road vehicle; and
    a braking torque applied to the driving wheels is given by a sum of a torque absorbed by the fluid-dynamic machines of the auxiliary services for their working and of a torque absorbed by the first reversible electric machine working as a generator.

3. The road vehicle according to claim 2, wherein, during the regenerative braking, the fluid-dynamic machines of the auxiliary services are controlled to maximize the torque absorbed for their working in so far as surrounding conditions allow.

4. The road vehicle according to claim 3, wherein, during the regenerative braking, the braking torque is always absorbed by the fluid-dynamic machines of the auxiliary services which are controlled to maximize the torque absorbed for their working in so far as the surrounding conditions allow and, if necessary, the braking torque is also absorbed by the first reversible electric machine working as generator; in this way, the braking torque requested during the regenerative braking is initially absorbed by the fluid-dynamic machines and, only in response to a capacity of the fluid-dynamic machines being saturated, the braking torque is also absorbed by the first reversible electric machine working as generator.

5. The road according to claim 1, wherein, during the regenerative braking, a first clutch interposed between the first primary shaft and the thermal internal combustion engine is opened to disconnect the thermal internal combustion engine from the first reversible electric machine.

6. The road vehicle according to claim 1, wherein the gearbox includes a box of the gearbox, inside which the first primary shaft, the secondary shaft and the gear couples are housed; wherein the first primary shaft is extended on an opposite side with regard to a first clutch in order to come out from the box of the gearbox to be coupled to the shaft of the first reversible electric machine.

7. The road vehicle according to claim 1, wherein, during the regenerative braking, the first reversible electric machine is coupled to the driving wheels, going into a gear associated to the first primary shaft in order to make the first primary shaft angularly integral to the secondary shaft.

8. The road vehicle according to claim 1, further comprising a clutch interposed between the shaft of the first reversible electric machine and the first primary shaft of the gearbox.

9. The road vehicle according to claim 1, wherein the uncoupling device includes a clutch.

10. The road vehicle according to claim 1, wherein the uncoupling device includes an idle wheel.

11. The road vehicle according to claim 1, wherein the fluid-dynamic machines of the auxiliary services include a pump of an oil hydraulic circuit of a hydraulically-assisted steering circuit.

12. The road vehicle according to claim 1, wherein the fluid-dynamic machines of the auxiliary services include a compressor of a climate control system.

13. The road vehicle according to claim 1, wherein the fluid-dynamic machines of the auxiliary services include a pump of a cooling circuit.

14. The road vehicle according to claim 1, wherein the fluid-dynamic machines of the auxiliary services include a pump of an oil hydraulic service circuit.

* * * * *